(12) United States Patent
Sheng et al.

(10) Patent No.: US 6,408,162 B1
(45) Date of Patent: Jun. 18, 2002

(54) ELASTIC COVER FOR A SCANNER

(75) Inventors: Thomas Sheng, Hsinchu; Devon Shyu, Tainan, both of (TW)

(73) Assignee: Avision Inc., Hsin-Chu (TW)

( * ) Notice: Subject to any disclaimer, the term of this patent is extended or adjusted under 35 U.S.C. 154(b) by 0 days.

(21) Appl. No.: 09/718,200

(22) Filed: Nov. 22, 2000

(30) Foreign Application Priority Data

Aug. 8, 2000 (TW) .................................. 089213814 U (51) Int. Cl.[7] .............................................. G03G 15/00
(52) U.S. Cl. ....................................................... 399/380
(58) Field of Search ................................ 399/107, 108, 399/365, 377, 379, 380; 150/165; 358/474; 49/397, 402

(56) References Cited

U.S. PATENT DOCUMENTS 4,357,101 A * 11/1982 Sasaki et al. ........... 399/380 X
5,060,019 A * 10/1991 Fukunaga ................... 399/380
5,574,542 A * 11/1996 Brook, III ................... 399/380

* cited by examiner

Primary Examiner—Sophia S. Chen
Assistant Examiner—Hoan Tran
(74) Attorney, Agent, or Firm—H. C. Lin (57) ABSTRACT

The elastic cover of a scanner has an elastic convex bottom plate to press against the paper to be scanned. The convex bottom plate has windows for air trapped in the duct of the convex bottom plate to flow out and press against the paper so that the paper does not fly when the cover is lifted.

5 Claims, 12 Drawing Sheets

ELASTIC COVER FOR A SCANNER

BACKGROUND OF THE INVENTION (1) Field of the Invention

This invention relates to a scanner, particularly to the cover of a scanner, copier, facsimile, etc.

(2) Brief Description of the Related Art

Figure 1:
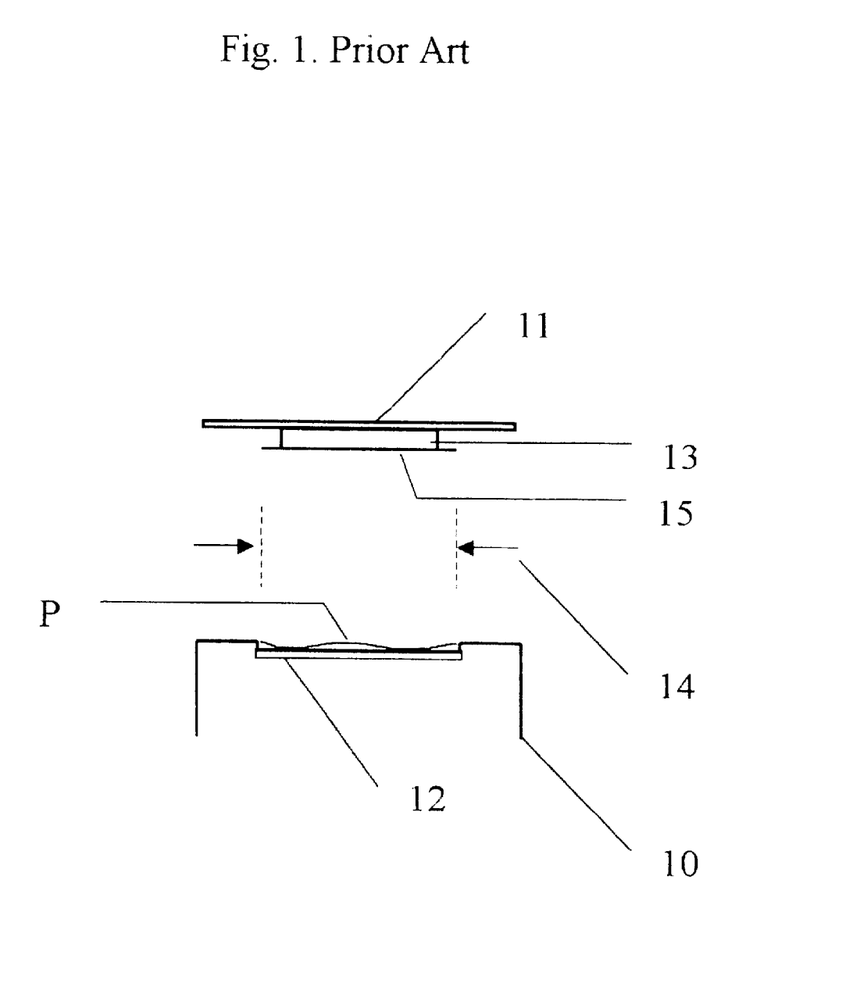
FIG. 1 shows a prior art cover of a scanner.

FIG. 1 shows a prior art scanner. The main body has a frame 10 and a scan window 12, on which a piece of paper P is placed. The scanner includes a cover having a lid 11 which is closed during scanning. The soft plate 15, which is slightly smaller than the scan window 12, is attached under the lid 11 through a block 13 made of foam rubber or sponge and presses against the piece of paper P, so that the paper lies flat against the scan window 12.

The soft plate 15 and the block 13, to which the soft plate 15 is attached, occupy vertical space and increase the cost of the cover. When the cover is lifted, the cover tends to suck the paper and to fly the paper.

SUMMARY OF THE INVENTION

An object of this invention is to reduce the overall thickness of the cover. Another object of this invention is to reduce the cost of the cover. Still another object of this invention is to avoid the scan paper from flying when the cover is lifted.

These objects are achieved by replacing the soft plate with an elastic convex bottom plate. An air duct is provided between the cover and the elastic plate, so that the paper does not fly when the cover is lifted.

DETAILED DESCRIPTION OF THE INVENTION

Figure 2:
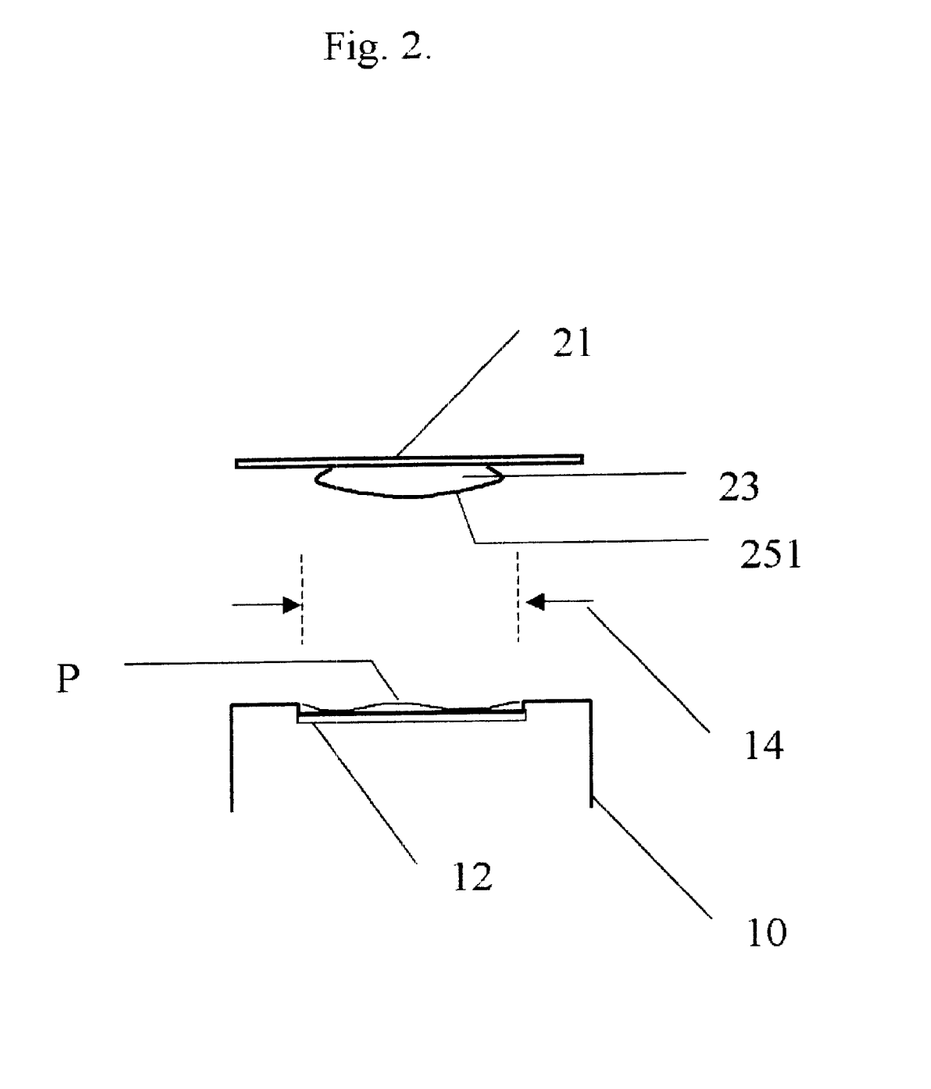
FIG. 2 shows the convex bottom plate of the cover based on the present invention.

FIG. 2 shows the basic structure of the present invention. The elastic cover includes a lid 21 and a convex bottom plate 251. The convex bottom plate 251 is mounted under the lid 21. When the lid 21 is closed against the scan window 12 on top of the scanner frame 10, the convex bottom plate 251 flattens the paper P lying over the window 12. The air duct 23 lets out air through windows in the convex bottom surface over the paper, so the paper does not fly when the cover is lifted.

Figure 3:
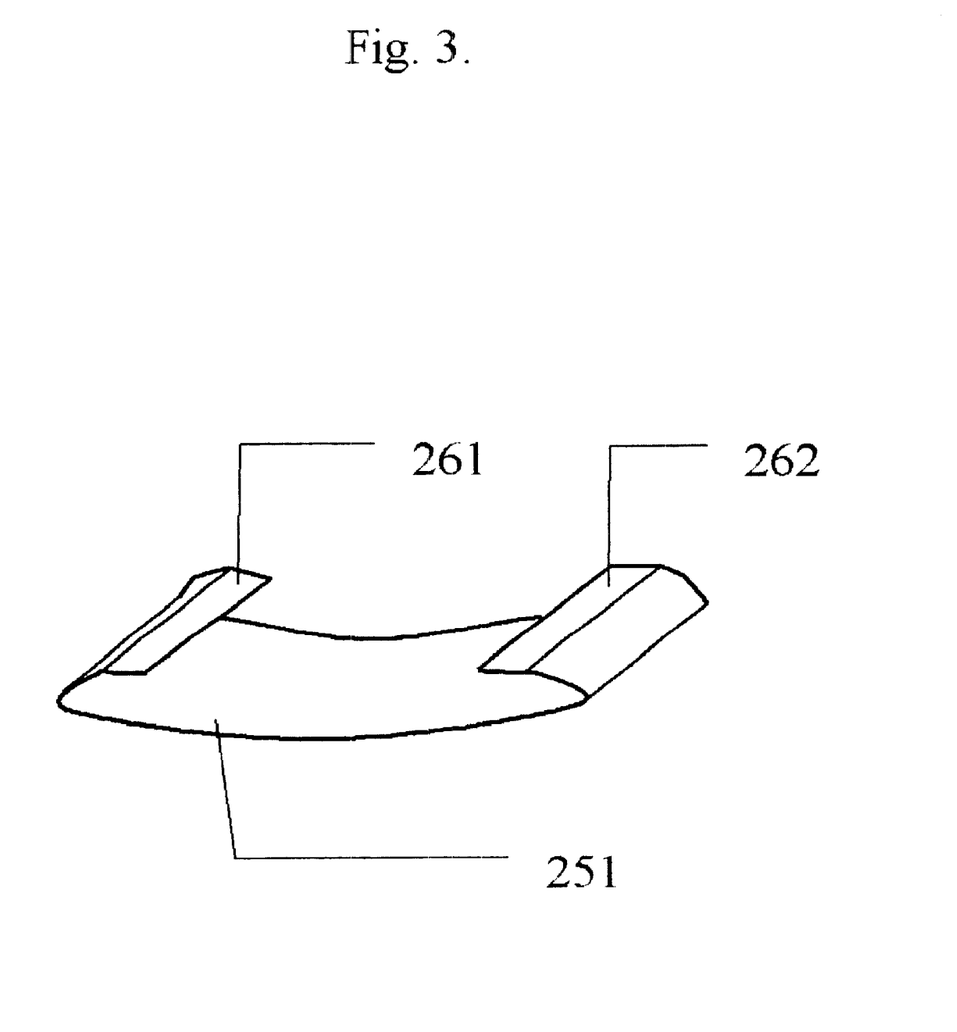
FIG. 3 shows the first embodiment of the convex bottom plate.

FIG. 3 shows the first embodiment of the convex bottom plate 251. The ends of the convex bottom plate are folded with two flat ends 261 and 262. The flat ends 261 and 262 are adhered to the lid 21 to form the convex bottom surface as shown in FIG. 2.

Figure 4:
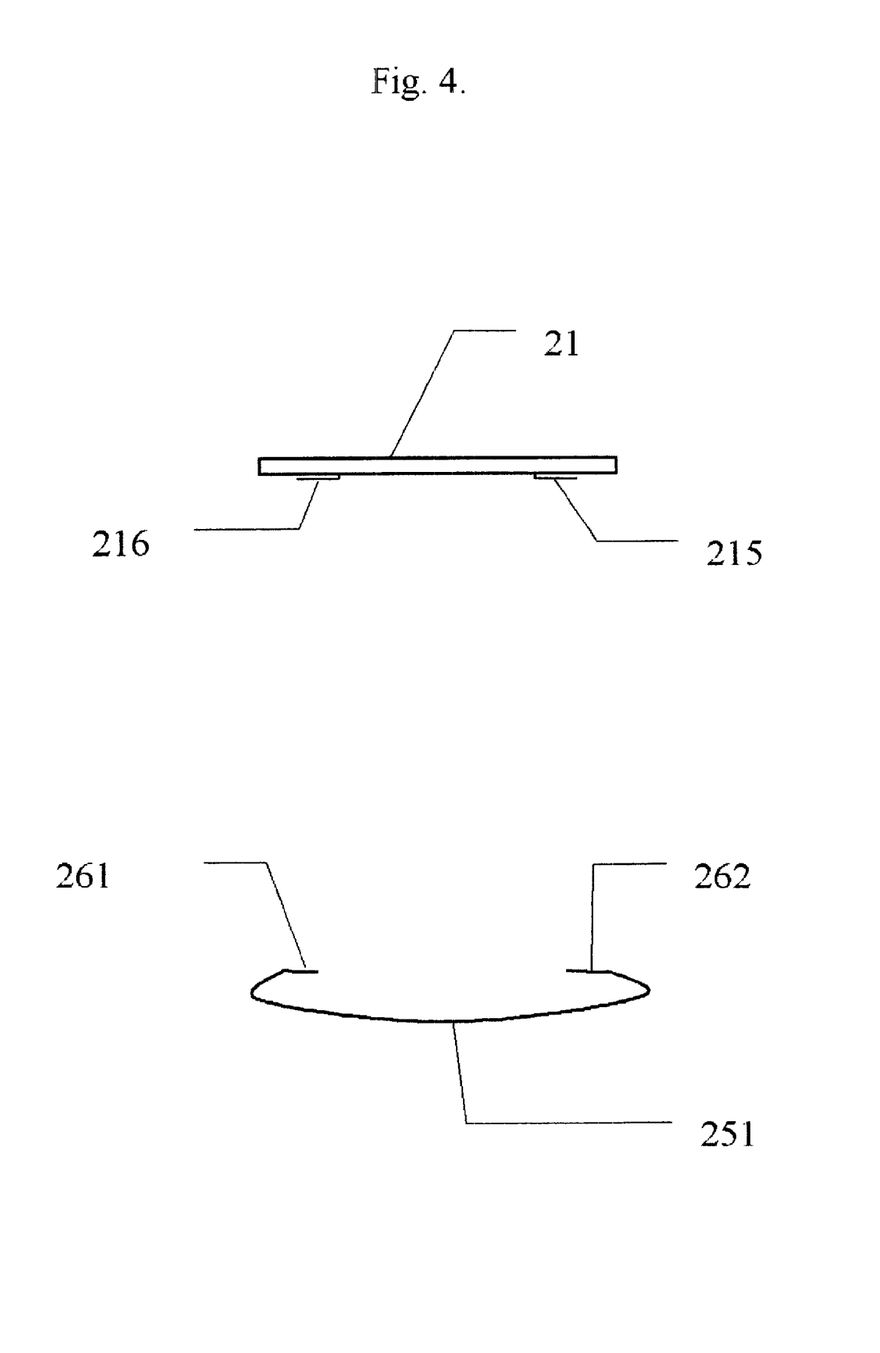
FIG. 4 shows the slits for holding the convex bottom plate of FIG. 3.

FIG. 4 shows two slits 215 and 216 under the lid 21 for the ends 261 and 262 of the convex bottom plate 251 to be inserted.

Figure 5:
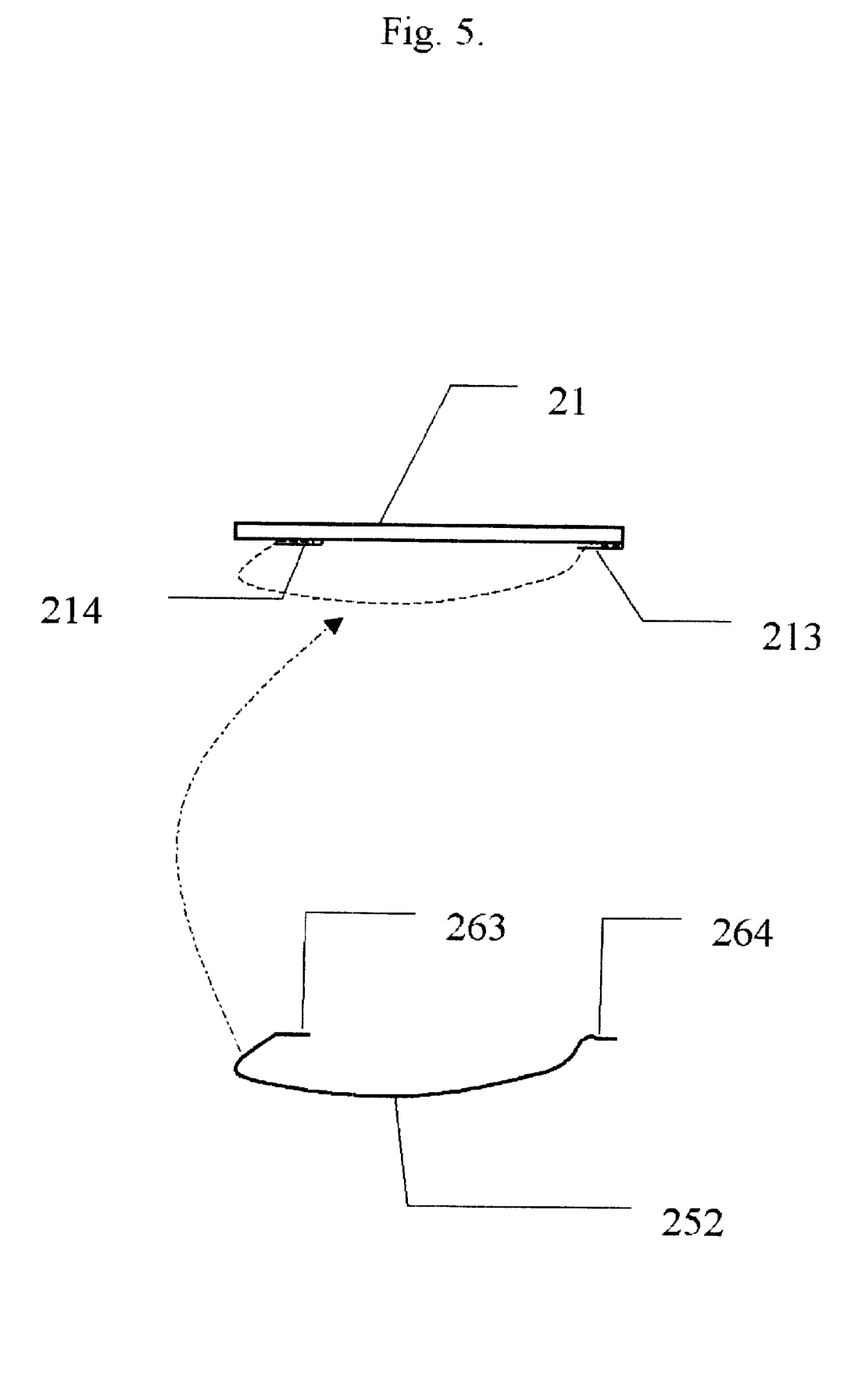
FIG. 5 shows a second embodiment of the convex bottom plate.

FIG. 5 shows a second embodiment of the convex bottom plate 251 with two flat ends 263 and 264 facing the same direction. The two slots 214 and 213 under the lid 21 have open ends for the flat ends 263 and 264 to be inserted respectively.

Figure 6:
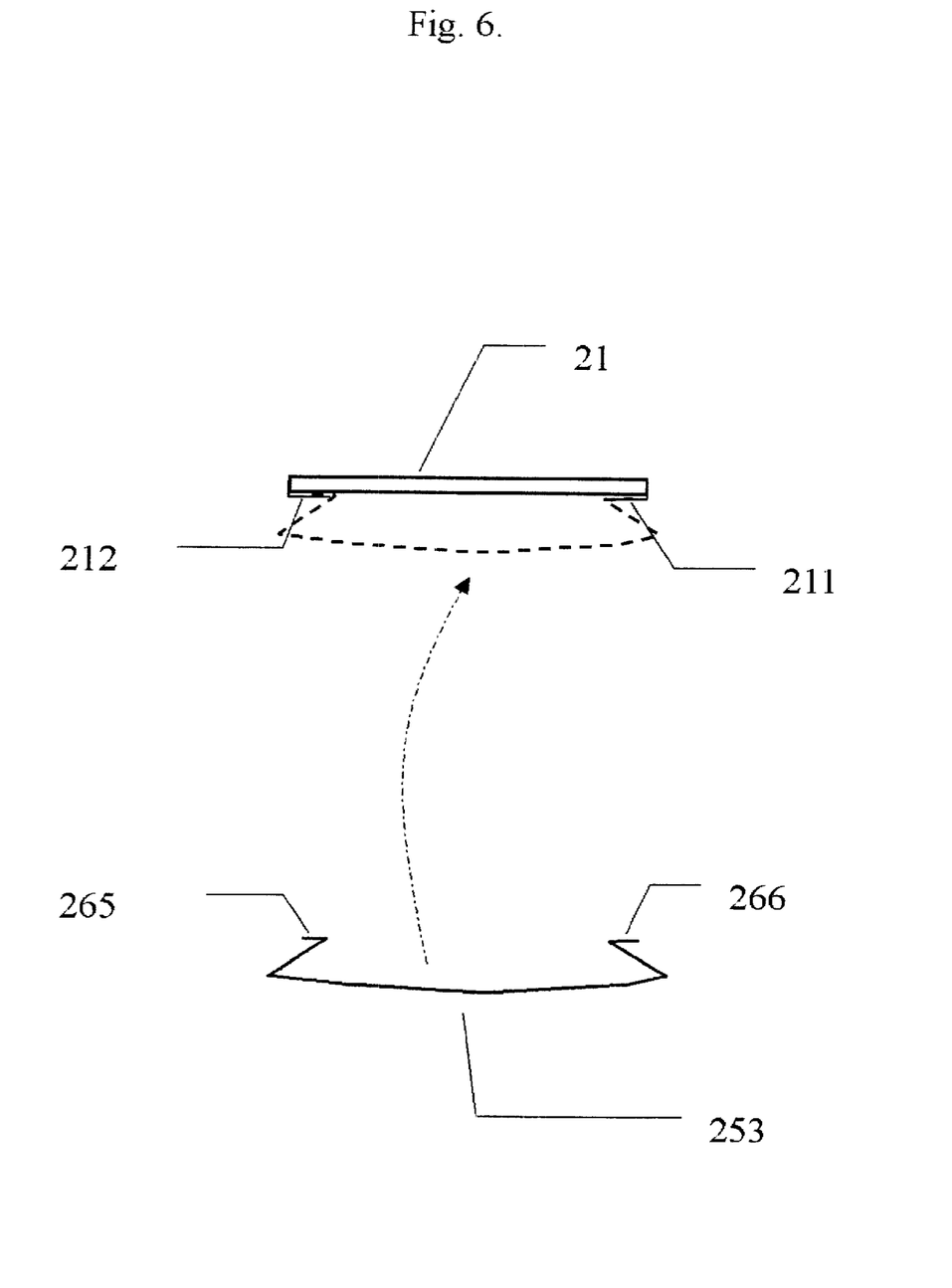
FIG. 6 shows a third embodiment of the convex bottom plate.

FIG. 6 shows a third embodiment of the convex bottom plate 253 with two zigzag ends 265 and 266. The slits 212 and 211 under the lid 21 have openings for the zigzag ends 265 and 266 to be inserted.

Figure 7:
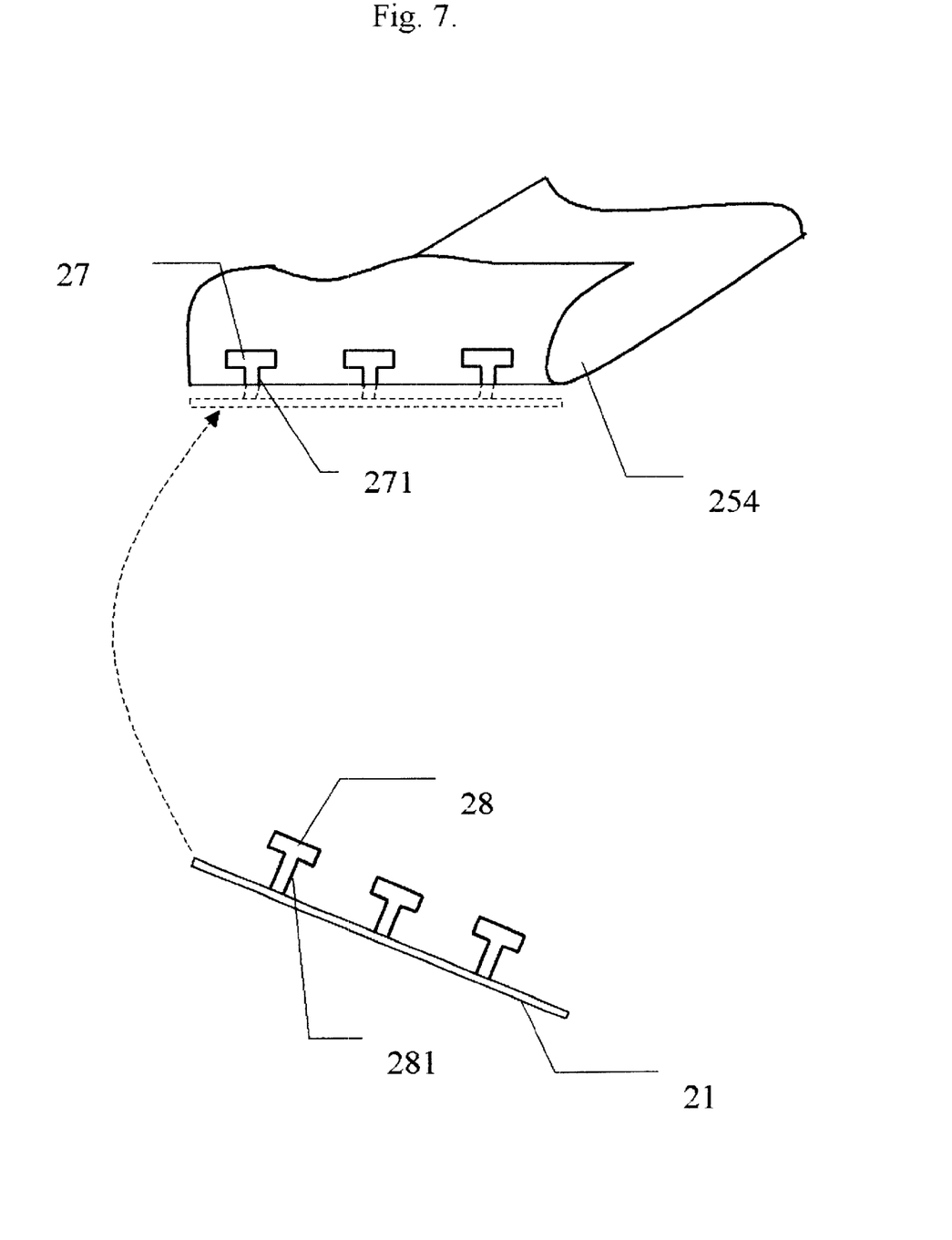
FIG. 7 shows a fourth embodiment of the convex bottom plate.

FIG. 7 shows a fourth embodiment of the convex bottom plate 254. The convex bottom plate 254 has T-shaped slots with T-bars 27 and stems 271. These T-shaped slots are fitted to T-shaped nails on the lid 21 with nail heads 28 and stems 281.

Figure 8:
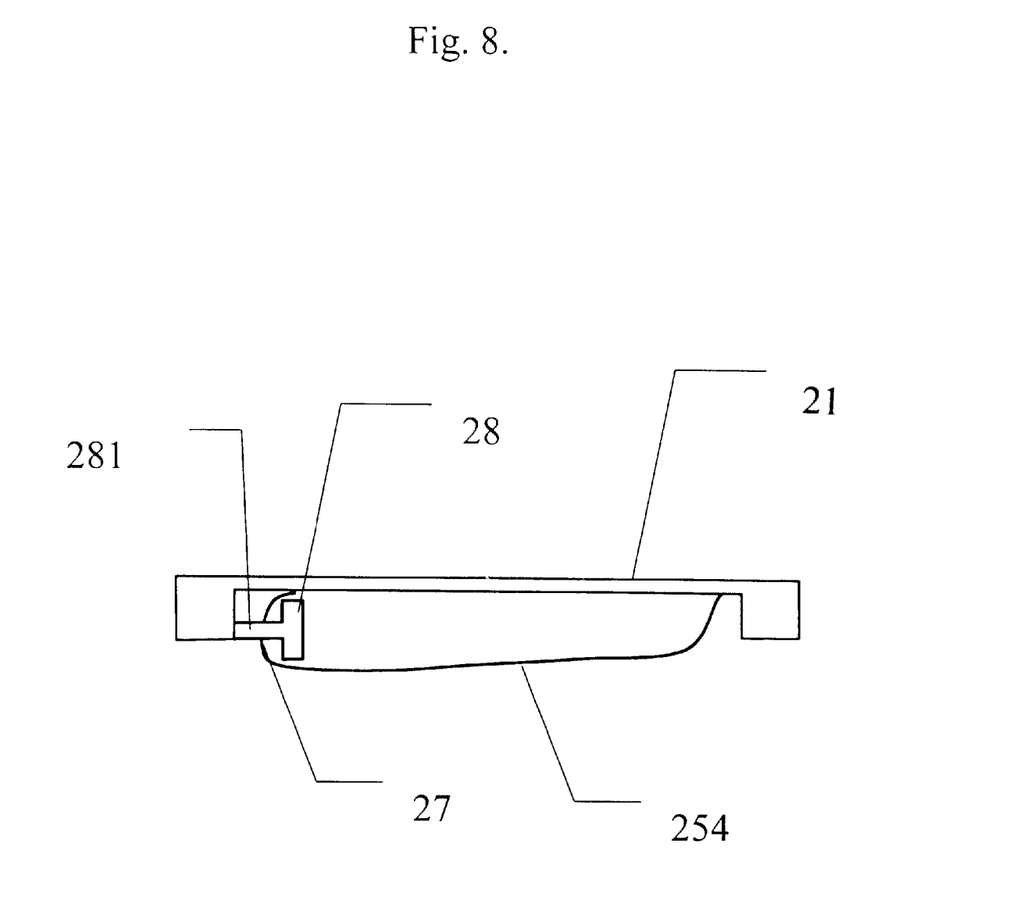
FIG. 8 shows a first method for the convex bottom plate to be mounted under the cover.

FIG. 8 shows how the T-shaped slots at the fold at one end of the convex bottom plate 254 are mated with the nail heads 28 and stems 281 at one end of the lid 21. The other end of the convex bottom plate 254 is attached to the other end of the lid 21.

Figure 9:
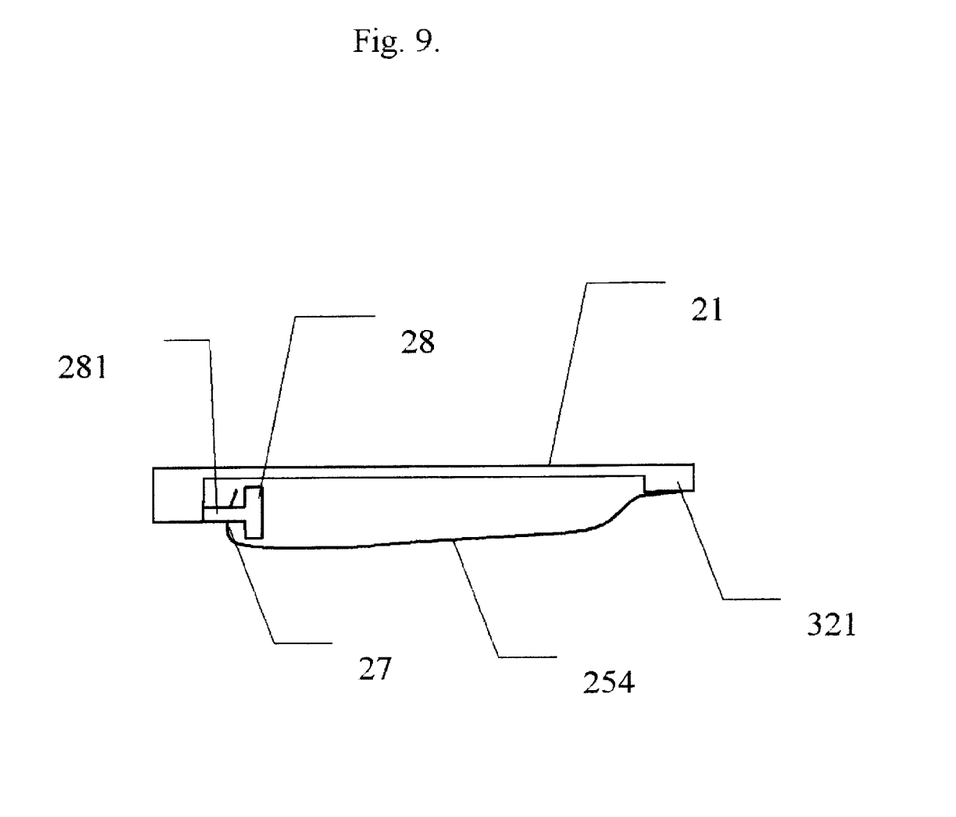
FIG. 9 shows a second method for the convex bottom plate to be mounted under the cover.

FIG. 9 shows another way to attach the other end of the convex bottom plate 254 under the end 321 of the lid 21.

Figure 10:
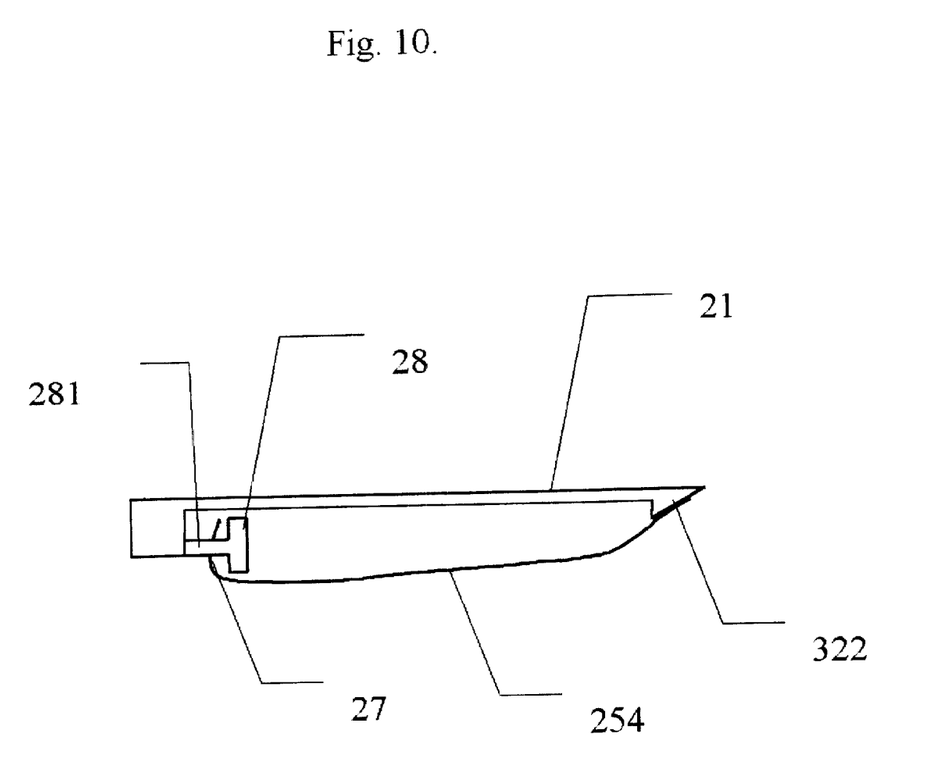
FIG. 10 shows a third method for the convex bottom plate to be mounted under the cover.

FIG. 10 shows a third method to attach the other end of the convex bottom plate 254 to a bevel end 322 of the lid 21.

Figure 11:
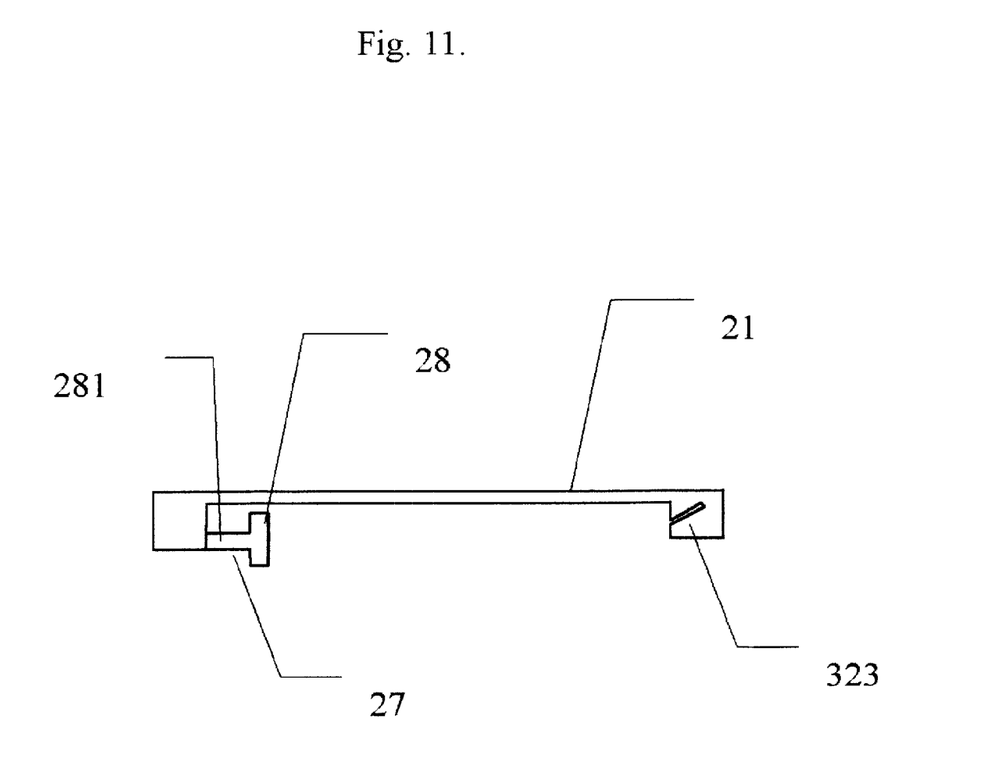
FIG. 11 shows the slot and the slit for the convex bottom plate to be inserted.

FIG. 11 shows a fourth method to attach the other end of the convex bottom plate 254 to a slit at the end 323 of the lid 21.

Figure 12:
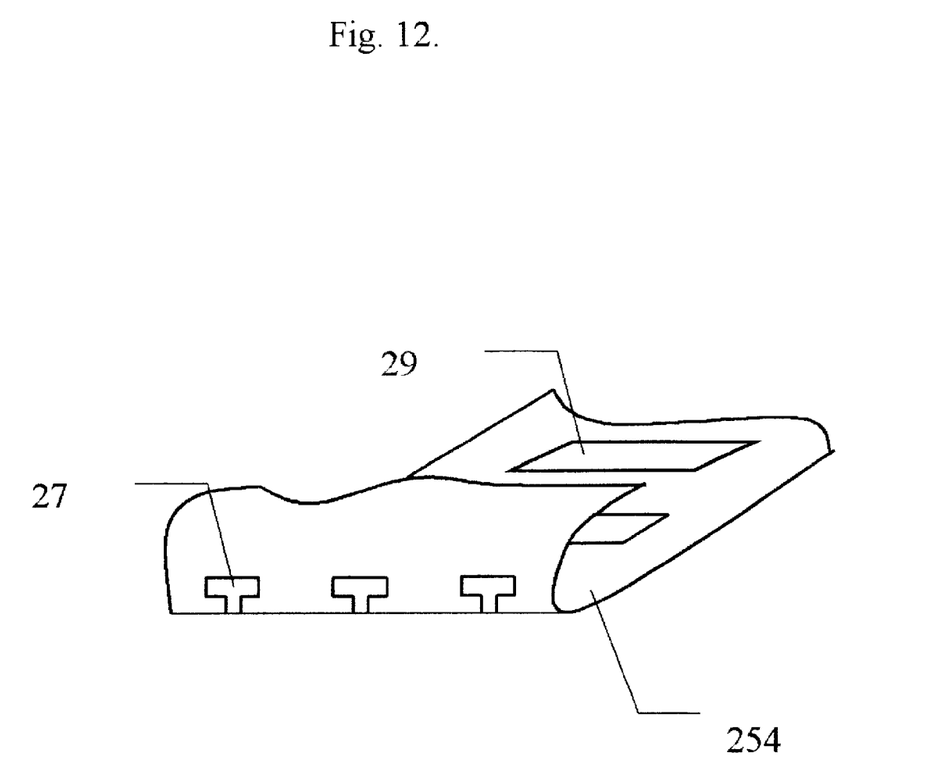
FIG. 12 shows windows in the convex bottom plate for airing.

FIG. 12 shows windows 29 in the convex bottom plate 254 for air to flow down and press against the paper, when the cover is lifted. Thus, the paper is prevented from flying.

What is claimed is:

1. An elastic cover for a scanner with a scan window over which a piece of paper is to be scanned, comprising:

a lid for covering over a piece of paper to be scanned;

a convex bottom plate having a first end and a second end both attached under said lid for pressing against said paper, wherein said lid has two slits for said ends to slide in.

2. The elastic cover as described in claim 1, wherein said ends face in opposite direction.

3. The elastic cover as described in claim 1, wherein said ends face the same direction.

4. The elastic cover as described in claim 1, wherein said ends are of zigzag shapes.

5. The elastic cover as described in claim 1 , wherein the first end of said convex bottom plates is folded and attached to a first end of said lid and the second end of said convex bottom plate is attached to a second end of said lid, and said first end of said convex bottom plate has T-shaped slots that are mated with T-shaped nails at said first end of said lid.

* * * * *